United States Patent [19]
Kurishige et al.

[11] Patent Number: 5,776,032
[45] Date of Patent: Jul. 7, 1998

[54] CLUTCH CONTROL DEVICE

[75] Inventors: Masahiko Kurishige; Hideaki Katashiba, both of Tokyo, Japan

[73] Assignee: Mitsubishi Denki Kabushiki Kaisha, Tokyo, Japan

[21] Appl. No.: 747,048

[22] Filed: Nov. 12, 1996

[30] Foreign Application Priority Data

May 21, 1996 [JP] Japan ................. 8-125634

[51] Int. Cl.$^6$ ................. B60K 41/02
[52] U.S. Cl. ................. 477/175; 477/180
[58] Field of Search ................. 477/174, 175, 477/176, 180

[56] References Cited

U.S. PATENT DOCUMENTS

| | | | |
|---|---|---|---|
| 4,413,714 | 11/1983 | Windsor | 477/175 |
| 4,418,810 | 12/1983 | Windsor | 477/176 |
| 4,432,445 | 2/1984 | Windsor | 477/176 |
| 5,002,170 | 3/1991 | Parsons et al. | 477/174 |
| 5,060,770 | 10/1991 | Hirano et al. | |
| 5,074,166 | 12/1991 | Yamashita et al. | |
| 5,082,096 | 1/1992 | Yamashita et al. | 477/175 |

OTHER PUBLICATIONS

SAE Technical Paper Series 91041, "SCVT—A State of the Art Electronically Controlled Continuously Variable Transmission" 1991.

Primary Examiner—Khoi Q. Ta
Assistant Examiner—Sherry Lynn Estremsky
Attorney, Agent, or Firm—Sughrue, Mion, Zinn, Macpeak & Seas, PLLC

[57] ABSTRACT

An automobile clutch control device comprises a target revolving speed generator 1 for generating a target revolving speed $N_r$ of an engine, a revolving speed detector 9 for detecting a revolving speed of the engine, a revolving speed error calculating unit 2 for calculating a target revolving speed error $E_r$ between the target revolving speed $N_r$ and the detected revolving speed $N_s$, a first controller 11a for outputting a clutch drive signal U3 which corresponds to the calculated target revolving speed error $E_r$, a revolving speed compensator 11b for outputting an engine revolving speed compensation signal U4, and an adder 11c for adding the clutch drive signal U3 and the revolving speed compensation signal U4 and outputting a target clutch drive signal U. The clutch 12 is controlled based on the output of the adder 11c.

12 Claims, 11 Drawing Sheets

Kp : PROPORTIONAL GAIN

FIG. 2

Kp : PROPORTIONAL GAIN

FIG. 7 a11, a12, a21, a22 : CONSTANT
b11, b21 : CONSTANT

FIG. 8

Kr RELAY GAIN

FIG. 10

Kde : PROPORTIONAL CONSTANT
Etd : ADDITION CONSTANT
Ene : REVOLVING SPEED VARIABLE

FIG. 11  PRIOR ART

CLUTCH CONTROL DEVICE

BACKGROUND OF THE INVENTION

1. Field of the Invention

The present invention relates to clutch control device which controls a clutch of a vehicle such as an automobile so that a better start characteristic of the vehicle is obtained, particularly in the case where the characteristic of the clutch changes.

2. Description of the Related Art

Figure 11:
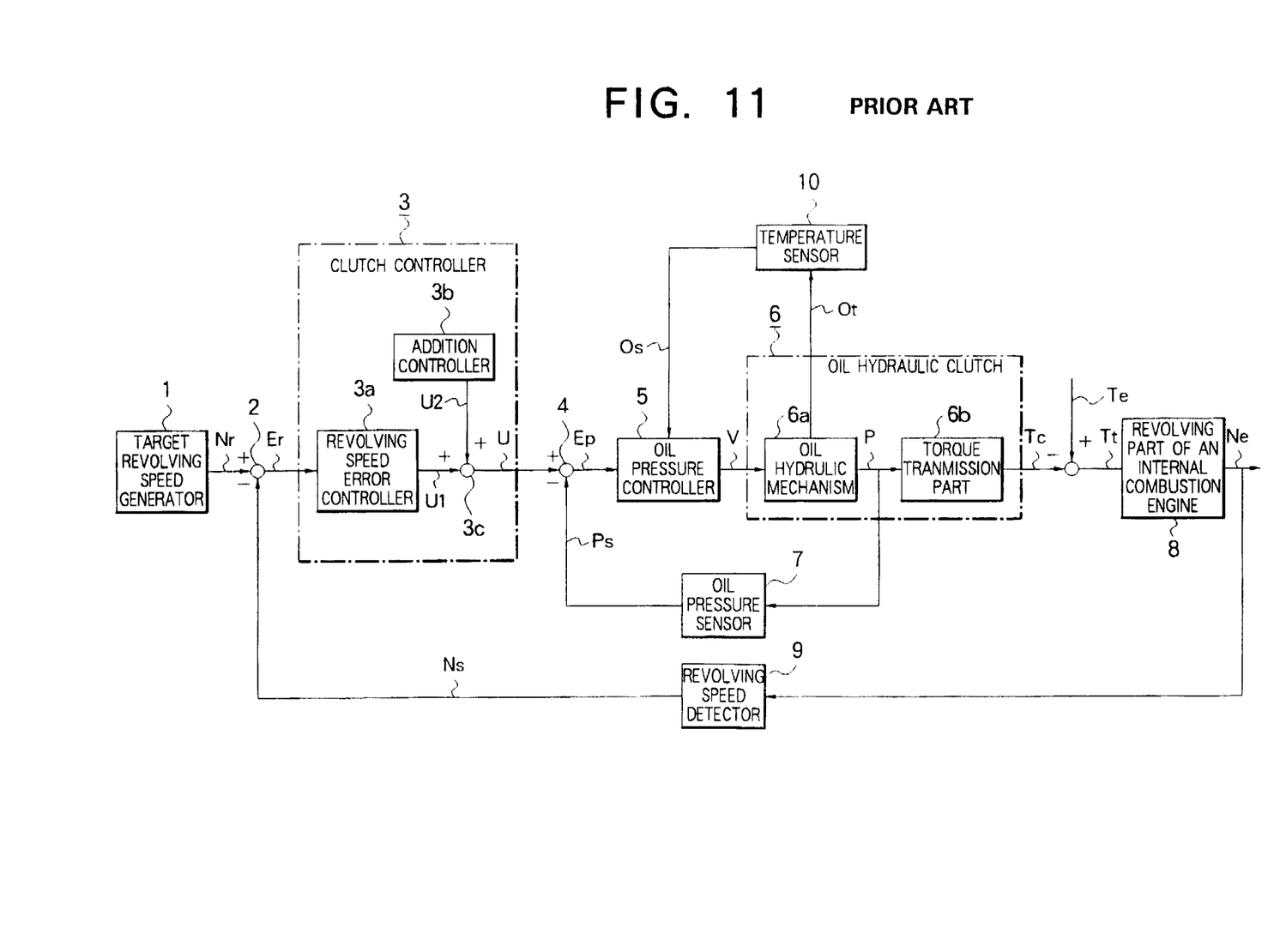
FIG. 11 is a block diagram showing a conventional automobile clutch device.

Generally, the clutch in a vehicle controls torque transmission between an engine such as an internal combustion engine and a driven member so that the revolving speed of the driven member smoothly changes, as in a clutch control device described, for example, in SAE technical paper series 910410. FIG. 11 shows a block diagram of the clutch control device disclosed in the aforementioned literature. In the figure, a revolving speed detector 2 calculates an error Er between the output of a target revolving speed generator 1 which generates a target revolving speed $N_r$ of an internal combustion engine and the output of a revolving speed detector 9 which detects a revolving speed $N_e$ of the internal combustion engine.

A clutch controller 3 calculates a target oil pressure value U of a clutch in the form of an oil hydraulic clutch 6, based on the output (error) Er of the revolving speed detector 2. An error $E_p$ between the output (target oil pressure value) U of the clutch controller 3 and the output $P_s$ of an oil pressure sensor 7 is calculated with an oil pressure subtracter 4. An oil pressure controller 5 generates an oil pressure drive signal V for driving the oil hydraulic clutch 6, based on the error $E_p$, which is the output of the oil pressure subtracter 4, and the output $O_s$ of a temperature sensor 10. For example, if the oil hydraulic clutch is an electromagnetic valve, a current for exciting the solenoid coil will be calculated. The driven member in the form of an internal-combustion engine's revolving part 8 such as an output member of a transmission changes a revolving speed by the difference $T_t$ between the output torque $T_c$ of the oil hydraulic clutch 6 and the output torque $T_e$ of an internal combustion engine (not shown).

The clutch controller 3 is constituted by a revolving speed error controller 3a and an addition controller 3b. The revolving speed error controller 3a determines a feedback control input U1 which becomes a clutch pressure for determining a revolving speed based on the output $E_r$ of the revolving speed detector 2. The addition controller 3b previously set a clutch pressure corresponding to a revolving speed as a feedforward control input U2 and adds the feedforward control input U2 to the feedback control input Ul by an adder 3c.

The oil hydraulic clutch 6 is constituted by an oil hydraulic mechanism 6a which determines an oil pressure P based on the output V of the oil pressure controller 5 and a torque transmitting part 6b which determines a transmission (clutch) torque based on the oil pressure P of the oil hydraulic mechanism 6a. The oil temperature $O_t$ of the oil hydraulic mechanism 6a is detected by the temperature sensor 10, and the detected value is output to the oil hydraulic mechanism 5 as an oil temperature sensor output $O_s$.

Now, the operation of the conventional clutch control device will be described. The revolving speed detector 2 calculates the error between the target revolving speed $N_r$ generated by the target revolving speed generator 1 and the revolving speed detector output $N_s$, and it is output as a target revolving speed error $E_r$. In the clutch controller 3, the revolving speed controller 3a calculates the feedback control input U1 with respect to the target revolving error $E_r$ calculated by the revolving speed subtracter 2. In addition, the adder 3c adds the feedback control input U1 and the feedforward control input U2 calculated by the addition controller 3b.

Then, the added value is output from the clutch controller 3 as a control input U which becomes a target oil pressure value of the oil hydraulic clutch 6. The revolving speed error controller 3a is constituted by a PI controller which is most generally used.

The error between the control input U and the output $P_s$ of the oil pressure sensor 7 is calculated with the oil pressure subtracter 4 and it is output as a target oil pressure error $E_p$. The target oil pressure error $E_p$ is input to the oil pressure controller 5, which in turn calculates the oil pressure drive signal V of the oil hydraulic mechanism 6a. The oil pressure drive signal V drives the oil hydraulic mechanism 6a, whereby oil pressure P is generated. In response to the oil pressure P, a clutch torque $T_c$ changes in a linear function manner.

The clutch torque $T_c$ serves as torque which reduces the revolving speed of the internal-combustion engine's revolving part 8. In addition, the difference $T_t$ between the internal-combustion engine torque $T_e$ which is torque for accelerating a revolving speed and the clutch torque $T_c$ acts on the internal-combustion engine's revolving part 8 as an accelerating or decelerating torque. Furthermore, the clutch torque $T_c$ acts as a drive torque which transmits the internal-combustion engine torque $T_e$ to the body of an automobile (not shown).

The oil hydraulic clutch 6 generates the oil pressure P at the oil hydraulic mechanism 6a in a first-order lag based on the oil pressure drive signal V calculated with the oil pressure controller 5. The oil pressure P generates a clutch torque $T_c$ at the torque transmitting part 6b in a linear function manner. In addition, the oil hydraulic characteristic of the oil hydraulic mechanism 6a changes with temperature. The oil pressure sensor 6 for compensating a change in the oil hydraulic characteristic caused due to a temperature change performs the feedback control of oil pressure by using the oil pressure controller 5 and then compensates the change in the oil hydraulic characteristic caused due to the temperature of the hydraulic pressure 6. Furthermore, the control parameter of the oil pressure controller 5 is adjusted by the output $O_s$ of the temperature sensor 10 which measures the oil temperature $O_t$ of the oil hydraulic mechanism 6a.

In the conventional clutch control device, the clutch controller 3 is constituted by a PI controller which is generally and most widely used due to the simple construction, as described above. For this reason, control performance is decreased when the characteristic of the oil hydraulic clutch 6 to be controlled changes, and sometimes vibration occurs in the body of an automobile when the clutch slips as in the case where the automobile is started.

To prevent the aforementioned problem, there is the need for feeding back the output of the oil pressure sensor 7 by using the oil pressure controller 5 for characteristic compensation of the hydraulic clutch 6 and compensating the characteristic change due to the temperature change of the hydraulic clutch 6. Furthermore, the control parameter of the oil pressure controller 5 needs to be adjusted by the output of the temperature sensor 10 to compensate the control performance change due to the temperature change of the hydraulic mechanism 6a.

Because the conventional clutch control device is constructed as described above, the oil pressure controller 5 for characteristic change compensation of the hydraulic clutch 6, the oil pressure sensor 7, and the temperature sensor 10 are required. In addition, because there is the need for adjusting the control parameter of the oil pressure controller 5 in accordance with the output $O_s$ of the temperature sensor 10, the possible problems exist that the number of processes for manufacturing a control device will be increased and thus the manufacture will take labor and time and also that the cost of the device itself and the manufacture will be increased because two expensive sensors need to be provided.

SUMMARY OF THE INVENTION

The present invention has been made in order to solve problems such as described above. Accordingly, one object of the present invention is to provide a clutch control device in which there is no increase in the number of processes for adjusting control parameters upon a change in the characteristic of the clutch and there is no need for providing an additional sensor for sensing such a change. Another object of the present invention is to provide a clutch control device where no vibration occurs in the body of a vehicle upon starting thereof, even when the control performance of the clutch is decreased.

To achieve the foregoing objects and in accordance with one aspect of the present invention, a clutch control device comprises: a clutch disposed on a torque transmission path between an engine and a driven member; target revolving speed generating means for generating a target revolving speed of the engine; revolving speed detecting means for detecting a revolving speed of the engine; revolving speed error calculating means for calculating an error between the target revolving speed and the detected revolving speed; clutch control means for outputting a clutch drive signal which corresponds to the calculated error; drive signal setting means for outputting a clutch drive signal which corresponds to the revolving speed of the internal combustion engine; and an adder for adding an output of the clutch control means and an output of the drive signal setting means and outputting a clutch drive signal corresponding to the target revolving speed to the clutch. The clutch is controlled based on an output of the adder.

With this arrangement, part of a dynamic characteristic which governs the revolving speed of the engine is compensated and then the remaining revolving speed error is controlled in a feedback manner. As a result, the control quantity of the first controller based on the feedback control is only used for suppressing a variation in the characteristic of the clutch or external disturbances and therefore it becomes possible to prevent the vibration of the driven member which is caused due to a variation in the clutch characteristic, while reducing a danger of oscillation which is caused by the feedback control.

In a preferred form of the invention, the drive signal setting means comprises: torque estimating means for calculating an output torque of the engine; torque converting means for converting the target revolving speed to a corresponding torque; and clutch drive signal calculating means for outputting a clutch drive signal which corresponds to the revolving speed of the engine, based on a difference between the calculated output torque and the converted torque.

With this arrangement, it becomes possible to estimate an output torque of an engine only by a sensor normally provided in a vehicle on which the engine is mounted. Therefore, there is the advantageous effect that an optimum revolving speed compensation for input is obtainable, while grasping the engine operating state each time, without employing a special sensor such as a torque sensor.

In another preferred form of the invention, the target revolving speed generating means comprises: a target revolving speed calculating unit for calculating and outputting a steady-state value of the target revolving speed; and a second-order delay filter to which the output steady-state value of the target revolving speed is input and which outputs a target revolving speed by giving second-order delay processing to the steady-state value.

Therefore, with the same effect as a damper in a secondary damping system such as a spring-mass vibration system, it becomes possible to reduce the change rate of the target revolving speed. As a consequence, even in the case where the steady-state value of the target revolving speed changes by steps, the target revolving speed can be smoothly changed. In addition, a change in the revolving speed of the engine becomes smooth by a combination of the target revolving speed generating means and the clutch control means. Therefore, there is the advantageous effect that clutch control can be performed without causing vibration to occur in the driven member and hence in the body of a vehicle.

In still another preferred form of the invention, the clutch control means has a relay characteristic.

For this reason, even when a very small target revolving speed error occurs, a control input which causes a revolving speed error to disappear is sufficiently increased and therefore an actual revolving speed of the engine becomes equal to the target revolving speed at all times independently of a characteristic change in the clutch. Therefore, there is the advantageous effect that excellent clutch control can be obtained in which there is no need for adjusting control parameters and providing an additional sensor to compensate for a characteristic change in the clutch and in which no substantial vibration occurs in a vehicle upon starting thereof when control performance of the clutch is reduced.

In a further preferred form of the invention, the clutch control means sets a nonsensitive band having a predetermined width with a deviation of zero as a center to the relay characteristic, or sets a proportional part to the relay characteristic.

Therefore, a nonsensitive band having a predetermined width with a deviation of zero as a center, or a proportional part is set to the relay controller of the clutch control means. With this arrangement, a control unit becomes near zero even when a revolving speed error is in a negative value near zero at the time of the switchover of the relay and goes to a positive value immediately after the switchover. Therefore, it becomes possible to prevent a system which controls the revolving speed of the engine from becoming unstable due to the feedback control based on the relay, and that it also becomes possible to prevent vibration from occurring in the body of a vehicle.

In a further preferred form of the invention, the width of the nonsensitive band or the proportional part of the relay characteristic is a function of the sum of the inverse number of the revolving speed of the engine and a constant, multiplied by a coefficient.

Therefore, the width of the nonsensitive band or proportional part of the relay controller of the clutch control means is set to a function of the sum of the inverse number of the revolving speed of the engine and a constant, multiplied by a coefficient. With this, it becomes possible to set the width of the nonsensitive band or the proportional part to an optimum value at all times in correspondence to the relay switching time. As a result, it becomes possible to prevent a reduction in the control performance of the clutch control device, which would otherwise result from a characteristic change in the clutch due to an excessively large width of the nonsensitive band or proportional part.

In a further preferred form of the invention, the clutch control means adds an integrated value of the error multiplied by a proportional gain, to the error multiplied by a proportional gain, and then outputs a clutch drive signal which corresponds to the error.

Therefore, the degree of freedom of the construction of the clutch control device is increased and, particularly, it becomes possible to reduce the target revolving speed error which steadily occurs.

In a further preferred form of the invention, the clutch control means adds a differentiated value of the error multiplied by a proportional gain to the error multiplied by a proportional gain, and then outputs a clutch drive signal which corresponds to the error.

Therefore, the degree of freedom of the construction of the clutch control device is increased and, particularly, it becomes possible to reduce the target revolving speed error which steadily occurs.

In a further preferred form of the invention, the target revolving speed generating means comprises: a target revolving speed calculating unit for calculating and outputting a steady-state value of the target revolving speed; and a first-order delay filter to which the output steady-state value is input and which outputs a target revolving speed by giving a first-order delay processing to the steady-state value.

Therefore, the degree of freedom in the setting of the target revolving speed of the engine is increased and the change in the engine revolving speed becomes smooth. As a result, the clutch torque becomes even smoother and therefore it becomes possible to prevent the vibration of the vehicle body at the time of clutch slippage.

The above and other objects and advantages of the present invention will become apparent from the following detailed description when read in conjunction with the accompanying drawings.

DETAILED DESCRIPTION OF THE PREFERRED EMBODIMENTS

First Embodiment

Figure 1:
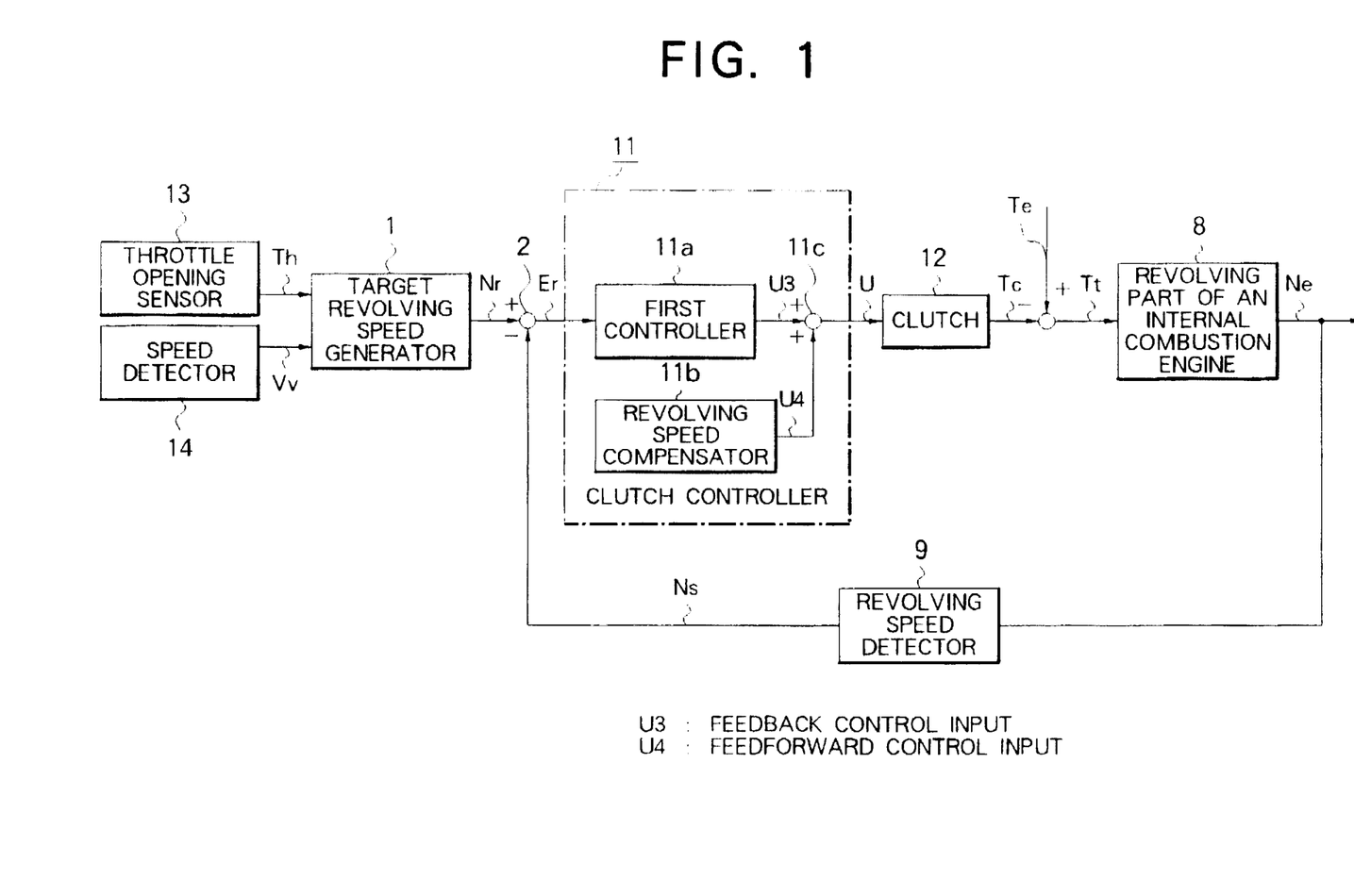
FIG. 1 is a block diagram showing a clutch control device according to a first embodiment of the present invention.

A first embodiment of the present invention will hereinafter be described in detail with reference to the drawings. Although, this invention relates to a clutch control device in general, the following description will be made where the invention is applied to an automotive clutch control device. FIG. 1 shows a block diagram of an automotive clutch control device constructed in accordance with the first embodiment of the present invention. The same reference numerals as in FIG. 1 represent identical or corresponding parts. In addition, the clutch control in respective embodiments is processed by a microcomputer based on the respective flowcharts. A revolving speed subtracter (revolving speed error calculating means) 2 calculates an error $E_r$ between a target revolving speed $N_r$ of an engine in the form of an internal combustion engine which a target revolving speed generator (target revolving speed generating means) 1 generates and an output $Ns$ of a revolving speed detector (revolving speed detecting means) 9 which detects a revolving speed $N_e$ of the internal combustion engine.

A clutch controller 11 comprises a first controller (clutch control means) 11a, a revolving speed compensator (drive-signal setting means) 11b, and an adder 11c. The first controller 11a calculates a feedback control input U3 which becomes a clutch pressure signal that corresponds to a target revolving speed error $E_r$ which is calculated by multiplying the error $E_r$ of the revolving speed subtracter 2 by a proportional gain $K_r$. The revolving speed compensator 11b outputs a feedforward control input U4 which is a signal representative of a set clutch pressure stored in a memory in the form of a map in relation to time. The adder 11c calculates a control input U which is the sum of the feedback control input U3 and the feedforward control input U4.

The control input U drives a clutch 12 as a clutch drive signal. For example, if the clutch 12 is an oil hydraulic clutch, the control input U will serve as a current for exciting an electromagnetic valve. The revolving speed of a driven member in the form of an internal-combustion engine's revolving part 8 is changed due to a difference $T_r$ between a clutch torque $T_c$ and an output torque $T_e$ of an internal combustion engine (not shown).

Now, the operation of the aforementioned first embodiment will be described. If it is judged based on a clutch control mode determination signal (not shown) that the automobile clutch control device is in a clutch slippage control state, the target revolving speed generator 1 will output the target revolving speed $N_r$ of the internal-combustion engine's revolving part 8, based on a throttle opening signal $T_h$ which is output from a throttle opening sensor 13. In addition, the revolving speed $N_e$ of the internal-combustion engine's revolving part 8 is detected by the revolving speed detector 9 and output therefrom as a revolving speed detector output Ns.

Next, the target revolving speed error $E_r$ between the target revolving speed $N_r$ and the revolving speed detector output $N_s$ is calculated by the revolving speed subtracter 2. The clutch controller 11 calculates a feedback control input U3 by multiplying the target revolving speed error $E_r$ by a proportional gain $K_p$. Then, the revolving speed compensator 11b outputs a feedforward control input U4 stored in a memory. Furthermore, the adder 11c adds the feedback control input U3 and the feedforward control input U4 to calculate a control input U. The control input U is output from the controller 11.

The control input U is a clutch drive signal, which serves as a solenoid valve drive signal such as a PWM drive duty ratio signal in the case where the clutch 12 is a solenoid valve type of oil hydraulic clutch and also serves a clutch drive current command signal in the case of an electromagnetic clutch. With a clutch drive signal such as this, the clutch 12 is driven. The revolving speed $N_e$ of the internal-combustion engine's revolving part 8 changes due to the difference, between the torque $T_c$ that the clutch 12 generates and the output torque $T_e$ of an internal combustion engine (not shown). The feedforward control input U4 is constituted by an engine torque pattern with an engine start pattern which is most frequently used, and it is stored in a memory in the form of a map in relation to time.

Figure 2:
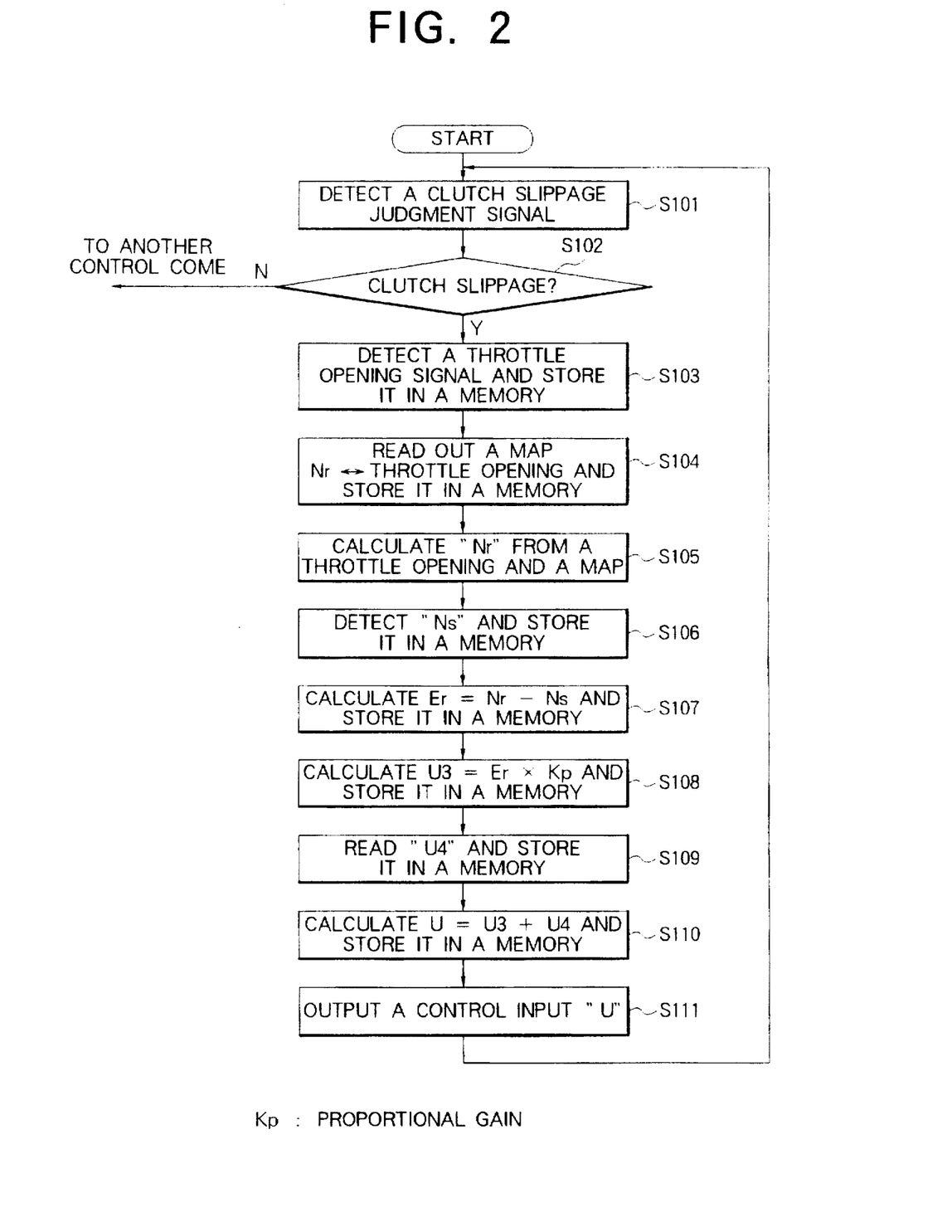
FIG. 2 is a flowchart showing the processing on a microcomputer according to the first embodiment of the present invention.

The processing in a microcomputer of the first embodiment will next be described in detail while referring to a flowchart of FIG. 2. First, in step 101 a clutch slippage judgment signal is detected. It is judged in step S102 whether clutch slippage exists. When clutch slippage is not detected, a direct or full connection clutch mode in which the clutch 12 is directly or fully connected without slippage will be processed and this algorithm is completed. When clutch slippage is detected, the following algorithm is executed.

First, in step S103 a throttle opening signal $T_h$ is detected by a throttle opening sensor 12 and then stored in a memory. Thereafter, in step S104 a map which gives the relationship between the throttle opening signal $T_h$ and the target revolving speed $N_r$ is read out and then stored in a memory. In step S105 the target revolving speed $N_r$ is calculated from the throttle opening signal $T_h$ stored in step S103 and the map stored in S104, and then stored in a memory.

Next, in step S106 the revolving speed detector output Ns representative of the revolving speed of the internal combustion engine is detected and then stored in a memory. In step S107 the target revolving speed error $E_r$ between the target revolving speed $N_r$ and the revolving speed detector output is calculated and then stored in a memory. In step S108 the product U3 of the target revolving speed error $E_r$ and the proportional gain $K_p$ is calculated and then stored in a memory.

Next, in step S109 the feedforward control input U4 is read in and then stored in a memory. In step S110 the sum U of the product U3 and the feedforward control input U4 is calculated and then stored in a memory. In step S111 the control input U is output, and step S111 returns to step S101. The processings from step S101 to step S110 are repeated.

Thus, the aforementioned first embodiment of the present invention is constructed in such a way that the clutch drive signal U is output based on the sum of the feedback control input U3 from the first controller 11a, which outputs the clutch drive signal U based on the target revolving speed error Er, and the feedforward input U4 from the revolving speed compensator 11b.

Therefore, part of the dynamic characteristic which governs the revolving speed of the internal combustion engine is compensated based on the sum of the feedback control input U3 and the feedforward input U4, and then the remaining revolving speed error is fed back and controlled. As a result, the control quantity of the first controller based on the feedback control is only used for suppressing a variation in the characteristic of a clutch or external disturbances, and therefore it becomes possible to prevent the vibration of the car body which is caused due to a variation in the clutch characteristic, while suppressing oscillation or fluctuation of the control value (the revolving speed of the revolving part 8) which would otherwise be caused by the feedback control.

Second Embodiment

In the first embodiment, the first controller 11a is constructed so that a feedback control input U3 is calculated by multiplying a target revolving speed error $E_r$ by a proportional gain $K_p$, however, the first controller 11a may be constructed so that the feedback control input U3 is calculated by adding at least either an integrated value of the target revolving speed error $E_r$ multiplied by a proportional gain $Ki$ or a differentiated value of the target revolving speed error $E_r$ multiplied by a proportional gain $Kd$ to the target revolving speed error $E_r$ multiplied by a proportional gain $K_p$.

Figure 3:
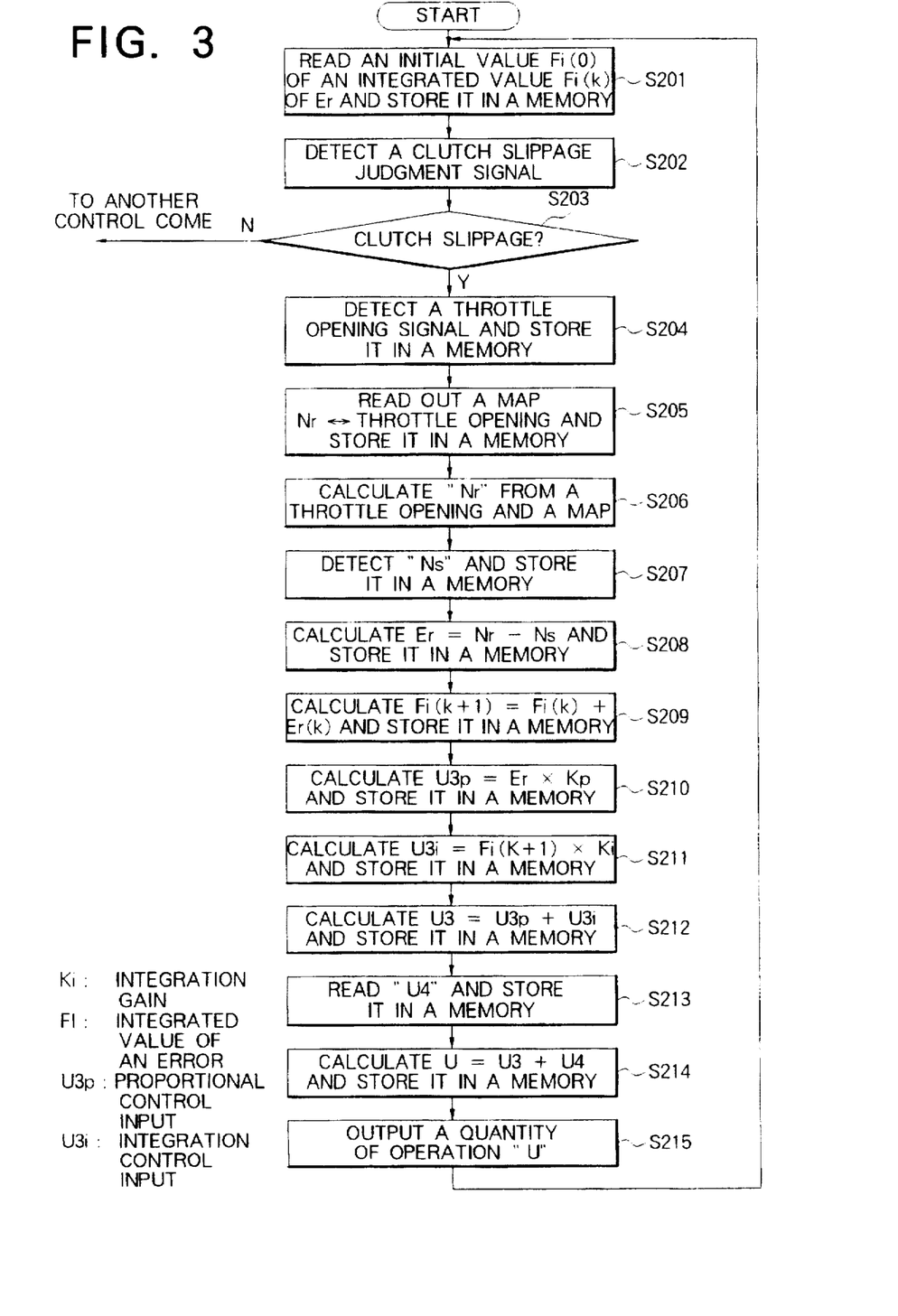
FIG. 3 is a flowchart showing the processing on a microcomputer according to a second embodiment of the present invention.

Now, the operation of the first controller 11a according to the second embodiment of the present invention will be described while referring to a flowchart of FIG. 3. A description will be concretely made of the processing on a microcomputer in the case where a control input U3 is calculated by adding an integrated value of a target revolving speed error $E_r$ multiplied by a proportional gain $Ki$ to a target revolving speed error $E_r$ multiplied by a proportional gain $K_p$.

First, in step S201 the initial value $F_i(0)$ of an integrated value $F_i(k)$ of a target revolving speed error $E_r$ is read in and then stored in a memory. Then, in step S202 a clutch slippage judgment signal is detected. It is judged in step S203 whether clutch slippage exists. When the clutch slippage is not detected, a direct or full clutch connection mode will be processed and this algorithm is completed. When the clutch is detected, the following algorithm is executed.

First, in step S204 a throttle opening signal is detected and then stored in a memory. Then, in step S205 a map which gives the relationship between the throttle opening signal $T_h$ and the target revolving speed $N_r$ is read out and then stored in a memory. In step S206 the target revolving speed $N_r$ is calculated from the throttle opening signal $T_h$ stored in step S204 and the map stored in S205, and then stored in a memory.

Next, in step S207 the revolving speed detector output Ns of the internal combustion engine is detected and then stored in a memory. In step S208 the target revolving speed error $E_r$ between the target revolving speed $N_r$ and the revolving speed detector output Ns is calculated and then stored in a memory. In step S209 the sum of the initial value $F_i(0)$ of the integrated value $F_i(k)$ and the target revolving speed error $E_r$ is calculated and then stored in a memory as an integrated value $F_i(1)$ of an error.

Next, in step S210 the product U3p of the target revolving speed error $E_r$ and the proportional gain $K_p$ is calculated and then stored in a memory. In step S211 the product U3p of the target revolving speed error $E_r$ and the proportional gain $K_p$ is calculated and then stored in a memory. In step S212 the sum of the product U3i of the integrated value $F_i(1)$ of the target revolving speed error $E_r$ and an integration gain $K_i$ is calculated and then stored in a memory. In step S213 a feedforward control input U4 is read in and then stored in a memory.

Next, in step S214 the sum U of the feedback control input U3 and the feedforward control input U4 is calculated and then stored in a memory. In step S215 the control input U is output, and step S215 returns to step S201. Thereafter, $F_i(0)$ in step S209 is replaced with $F_i(k+1)$ calculated in the previous step, and the processings from step S202 to step S215 are repeated.

In the aforementioned second embodiment the first controller 11a is constructed so that a feedback control input U3 is calculated by adding an integrated value of the target revolving speed error $E_r$ multiplied by a proportional gain $K_i$ to a target revolving speed error $E_r$ multiplied by a proportional gain $K_p$. Therefore, the degree of freedom of the construction of a control system is increased and, particularly, it becomes possible to reduce the target revolving speed error $E_r$ which steadily occurs.

Third Embodiment

In the aforementioned first embodiment or second embodiment, the feedforward control input U4 of the revolving speed compensator 11b of the clutch controller 11 is set beforehand and then stored in a memory. In this embodiment, an estimated internal-combustion engine output torque value $T_{es}$ is calculated from a revolving speed detector output $N_s$, and a throttle opening signal $T_h$. Also, a first-order-lag-compensated internal-combustion engine torque estimator output $T_{ee}$ is calculated from the estimated internal-combustion engine output torque value $T_{es}$. Furthermore, the feedforward control input U4 is calculated by subtracting a target revolving speed compensation torque $T_r$ from the output $T_{ee}$.

Figure 4:
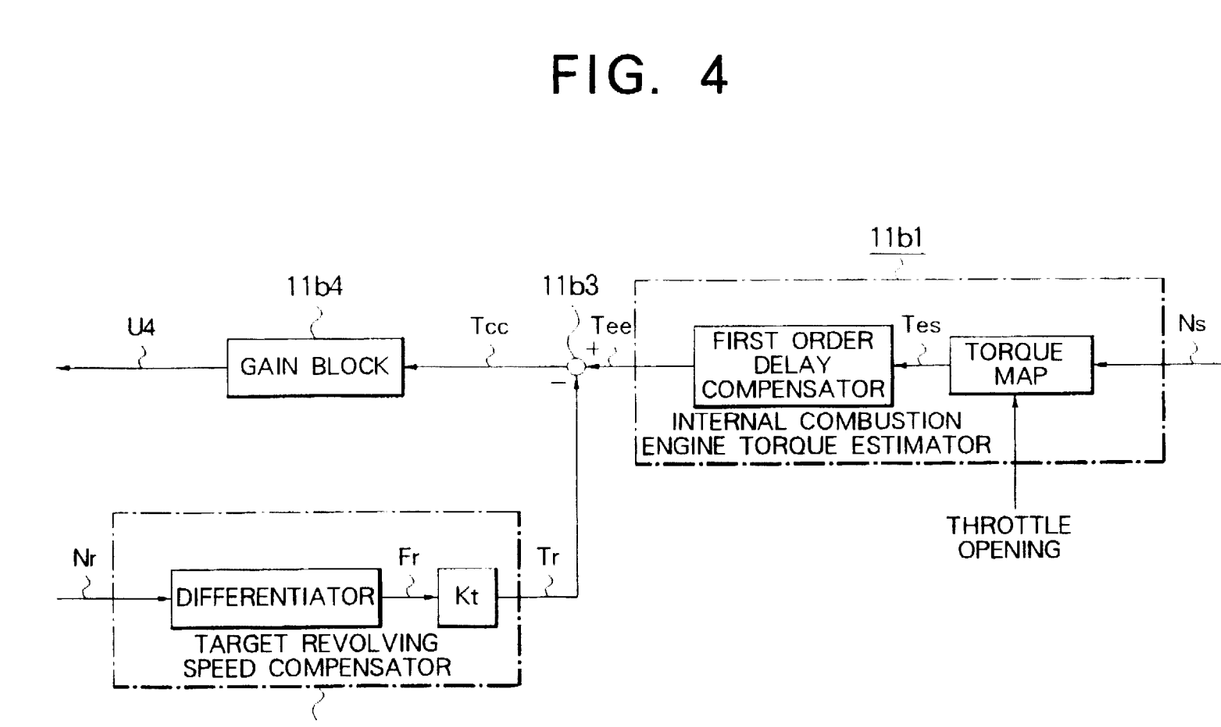
FIG. 4 is a block diagram showing a clutch control device according to the second embodiment of the present invention.

The third embodiment will hereinafter be described while referring to a block diagram of FIG. 4. An internal combustion engine torque estimator 11b1 is constituted by a torque map and a first-order-lag compensator. The torque map is obtained by experimentally measuring an output torque with respect to a throttle opening signal and a revolving speed detector output $N_s$. A target revolving speed compensator 11b2 is constituted by a differentiator which calculates an acceleration by differentiating a revolving speed $N_r$ and a gain block where the calculated acceleration is multiplied by a differential gain Kt to convert it to torque. A subtracter 11b3 calculates an error ($T_{cc}$) between the internal combustion engine torque estimator 11b1 and the target revolving speed compensator 11b2. A gain block 11b4 calculates a feedforward input U4 which is a current value from the converted torque by multiplying the subtracter output $T_{cc}$ by an input conversion gain $K_u$.

Figure 5:
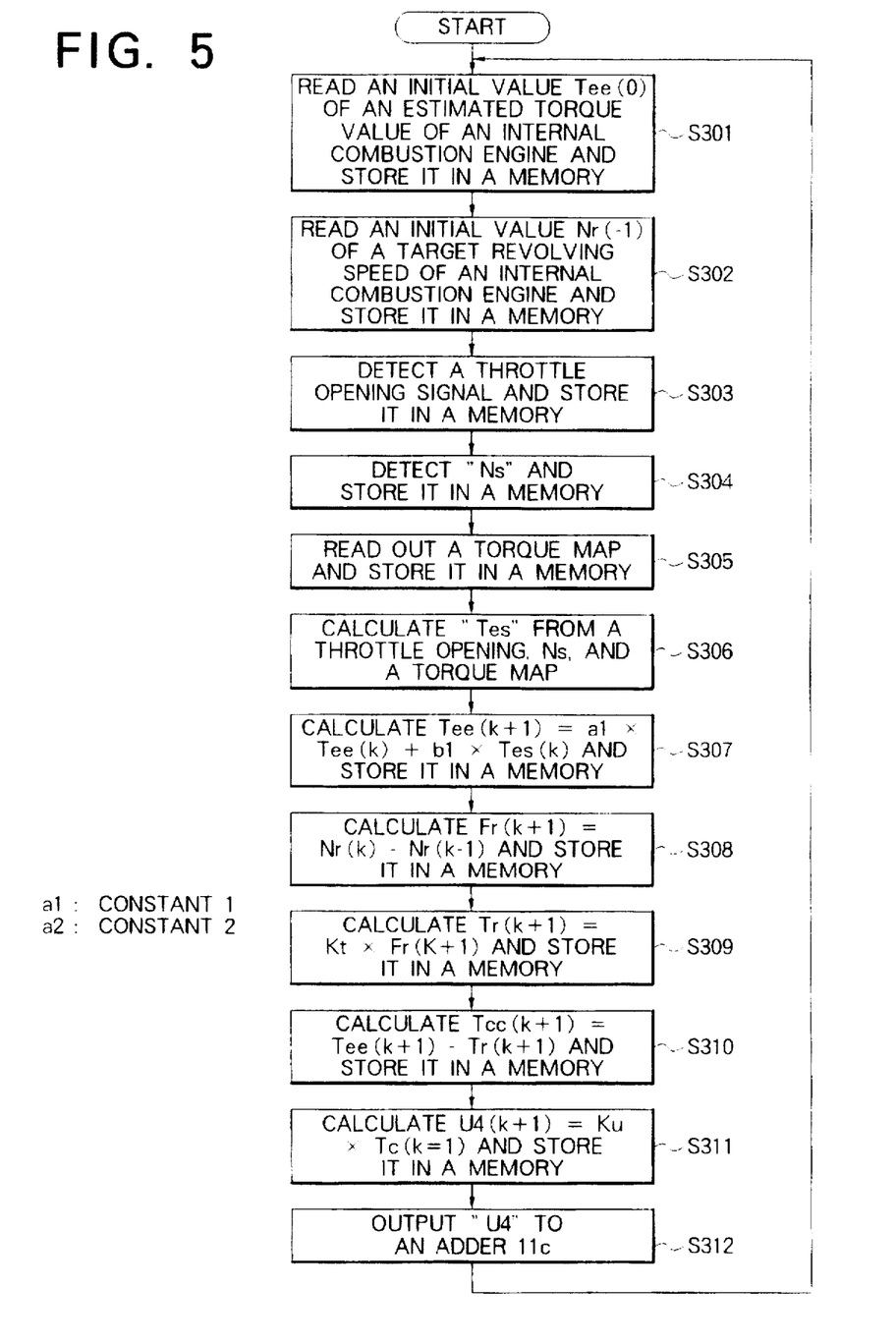
FIG. 5 is a flowchart showing the processing on a microcomputer according to a third embodiment of the present invention.

Now, the operation of the revolving speed compensator 11b of the third embodiment will be described while referring to a flowchart of FIG. 5. First, in step S301 the initial value $T_{ee}(0)$ of an estimated internal-combustion engine torque is read in and then stored in a memory. In step S302 the initial value $N_r(-1)$ of a target revolving speed is read in and then stored in a memory. In step S303 a throttle opening signal $T_h$ is detected and then stored in a memory. In step S304 a revolving speed detector output $N_s$, is detected and then stored in a memory. In step S305 a torque map is read out and then stored in a memory.

In step S306 an estimated steady-state internal-combustion engine torque value $T_{es}$ is calculated with the torque map from the throttle opening signal $T_h$ stored in step S303 and the revolving speed detector output $N_s$ stored in step S304. In step S307, when k=0, the equation $[T_{ee}(k+1) = a1 \times T_{ee}(k) + b1 \times T_{es}]$ is calculated and then stored in a memory. At this time, the $T_{ee}(0)$ read in step S301 is used for the value of $T_{ee}(k)$. In step S308, when k=0, the target revolving speed $[F_r(k+1)=N_r(k)-N_r(k-1)]$ is differentiated and then stored in a memory.

At this time, the initial value $N_r(-1)$ of the target revolving speed $N_r$ read in step 302 is used for $N_r(k-1)$. In step S309, $F_r(k+1)$ is multiplied by a differential gain $K_t$ to convert it to torque, and the result is stored in a memory as $T_r(k+1)$ In step S310, $T_r(k+1)$ is subtracted from $T_{ee}(k+1)$ and the result is stored in a memory as $T_{cc}(k+1)$. In step S311, the value obtained in step 310 is multiplied by an input conversion gain $k_u$ to calculate a feedforward input U4, which is then stored in a memory.

In step S312 the feedforward input U4 is output to the adder 11c, and step S312 returns to step S303. Thereafter, in step S307 $T_{ee}(0)$ is replaced with the $T_{ee}(k+1)$ calculated in the previous step, and in step S308 $N_r(-1)$ is replaced with the target revolving speed $N_r(k)$ in the previous step, and the same processing is repeated.

The aforementioned third embodiment of the present invention is constructed so that it is comprised of an internal-combustion engine torque estimator 11b1, which calculates an internal-combustion engine torque from a revolving speed detector output $N_s$ and a throttle opening signal $T_h$, and a target revolving speed compensator 11b2. In addition, the output of the target revolving speed compensator 11b2 is subtracted from the output of the internal-combustion engine torque estimator 11b1. Therefore, it becomes possible to estimate the output torque of an electronically controlled internal combustion engine only by a sensor normally provided in an automobile on which the internal combustion engine is mounted. For example, it becomes possible to provide an optimum revolving speed compensation input, while grasping the operative state each time, without employing a special sensor such as a torque sensor.

Fourth Embodiment

The aforementioned first embodiment, second embodiment, and third embodiment of the present invention are constructed in such a manner that the target revolving speed $N_r$ is determined with a map from a throttle opening signal, however, a fourth embodiment is constructed so that the target revolving speed $N_r$ is determined with a map with respect to a throttle opening signal and a speed signal, and that a value calculated with the map is passed through a first-order delay filter.

Figure 6:
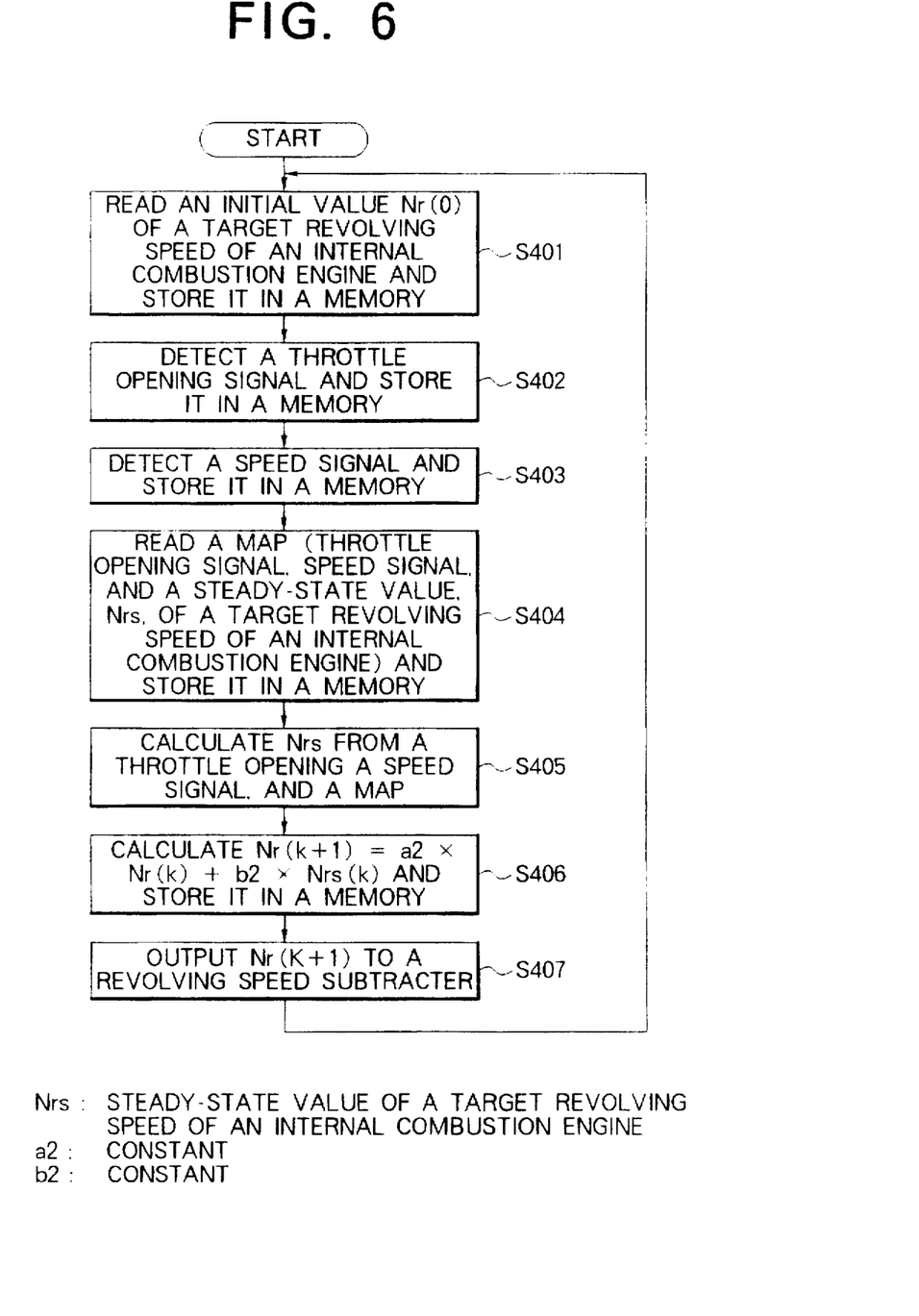
FIG. 6 is a flowchart showing the processing on a microcomputer according to a fourth embodiment of the present invention.

Now, the calculation procedure on a microcomputer of the target revolving speed $N_r$ of the fourth embodiment will be described while referring to a flowchart of FIG. 6. First, in step S401 the initial value $N_r(0)$ of the target revolving speed is read in and then stored in a memory. In step S402 a throttle opening signal $T_h$ is read in and then stored in a memory. In step S403 a speed signal is read in and then stored in a memory.

In step S404 a map, which determines the relationship between a throttle opening signal $T_h$, a speed signal, and a steady-state value of a revolving speed of an internal combustion engine, is read in and then stored in a memory. In step S405 a steady-state value $N_{rs}$ of a revolving speed of an internal combustion engine is calculated from the throttle opening signal $T_h$ stored in a memory in step S402, the speed signal stored in a memory in step S403, and the map stored in a memory in step S404, and it is stored in a memory. In step S406, when k=0, the equation $[N_r(k+1)=a2\times N_r(k)+b2\times N_{rs}]$ is calculated, and the calculated value is passed through a first- order delay filter and stored in a memory.

At this time, the target revolving speed $N_r$ uses an initial value $N_r(0)$. In step S407 the calculated target revolving speed $N_r(k+1)$ is output to the revolving speed subtracter 2, and step S407 returns to step 8402. Thereafter, in step S406 the target revolving speed $N_r(k)$ is replaced with the target revolving speed $N_r(k+1)$ calculated in the previous step, and the same processing is repeated.

The aforementioned fourth embodiment is constructed so that the target revolving speed $N_r$ is determined with a map with respect to a throttle opening signal and a speed signal, and that a value calculated with the map is passed through a first- order delay filter. The degree of freedom of the target revolving speed is increased and the change thereof becomes smooth. As a result, the clutch torque change becomes even smoother and therefore it becomes possible to prevent the vibration of the car body at the time of clutch slippage.

Fifth Embodiment

In the fourth embodiment when the target revolving speed $N_r$ is determined, a value, calculated with a map from a throttle opening signal $T_h$ and a speed signal $V_y$, is passed through a first-order delay filter, however, in a fifth embodiment the value is passed through a second-order delay filter.

Figure 7:
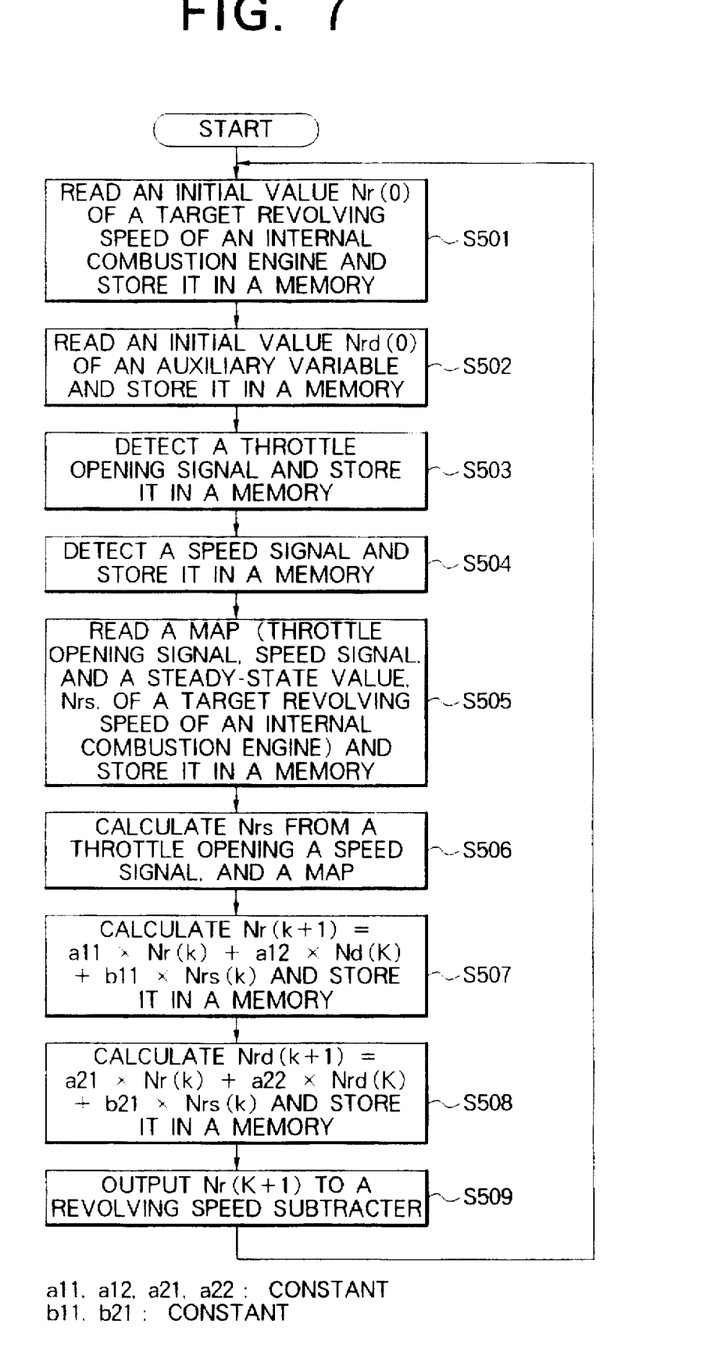
FIG. 7 is a flowchart showing the processing on a microcomputer according to a fifth embodiment of the present invention.

Now, the calculation procedure on a microcomputer of the target revolving speed $N_r$ of the fifth embodiment will be described while referring to a flowchart of FIG. 7. First, in step S501 the initial value $N_r(0)$ of the target revolving speed $N_r$ is read in and then stored in a memory. In step S502 an initial value $N_{rd}(0)$ of an auxiliary variable $N_{rd}(k)$ is read in and then stored in a memory. In step S503 a throttle opening signal $T_h$ is read in and then stored in a memory.

In step S504 a speed signal is read in and then stored in a memory. In step S505 the map, which determines the relationship between a throttle opening signal $T_h$, a speed signal $V_y$, and a steady-state value of a revolving speed of an internal combustion engine, is read in and then stored in a memory. In step S506 the steady-state value $N_{rs}$ of the revolving speed is calculated from the throttle opening signal $T_h$ stored in step S504, the speed signal $V_y$ stored in step S504, and the map stored in step S505, and it is stored in a memory.

In step S507, when k=0, the equation $[N_r(k+1)=a11\times N_r(k)+a12\times N_{rd}(k)+b11\times N_{rs}]$ is calculated, and the calculated value is passed through a second-order delay filter and stored in a memory. At this time, the target revolving speed $N_r$ uses an initial value $N_r(0)$.

In step S508 when k=0, the equation $[N_{rd}(k+1)=a21\times N_r(k)+a22\times N_{rd}(k)+b21\times N_{rs}]$ is calculated and then stored in a memory. At this time, the auxiliary variable $N_{rd}(k)$ uses an initial value $N_{rd}(0)$.

In step S509 the calculated target revolving speed $N_r(k+1)$ is output, and step S509 returns to step S503. Thereafter, in step S507 the target revolving speed $N_r(k)$ is replaced with the target revolving speed $N_r(k+1)$ calculated in the previous step. In step S508 the auxiliary variable $N_{rd}(k)$ is replaced with $N_{rd}(k+1)$ calculated in the previous step, and the same processing is repeated.

The aforementioned fifth embodiment is constructed so that the target revolving speed $N_r$ is determined from the map relative to a throttle opening signal $T_h$ and a speed signal $V_y$, and that a value calculated with the map is passed through a second-order delay filter. Therefore, with the same effect as a damper in a secondary damping system such as a spring-mass vibration system, it becomes possible to reduce the change rate of the target revolving speed. As a consequence, even in the case where the steady-state value of the target revolving speed changes by steps, there is no inflection point which occurs at a primary filter and it becomes possible to smoothly change the target revolving speed. In addition, an ability of suppressing the vibration of the car body is further increased when the clutch slips.

Sixth Embodiment

In the aforementioned first and second embodiments, the first controller 11a is constructed so that the target revolving speed error $E_r$ is multiplied by a proportional gain, or the integrated value of the target revolving speed error $E_r$ multiplied by a proportional gain is added to the target revolving speed error $E_r$ multiplied by a proportional gain. However, in a sixth embodiment of the present invention, the first controller 11a is constituted by a relay controller.

Figure 8:
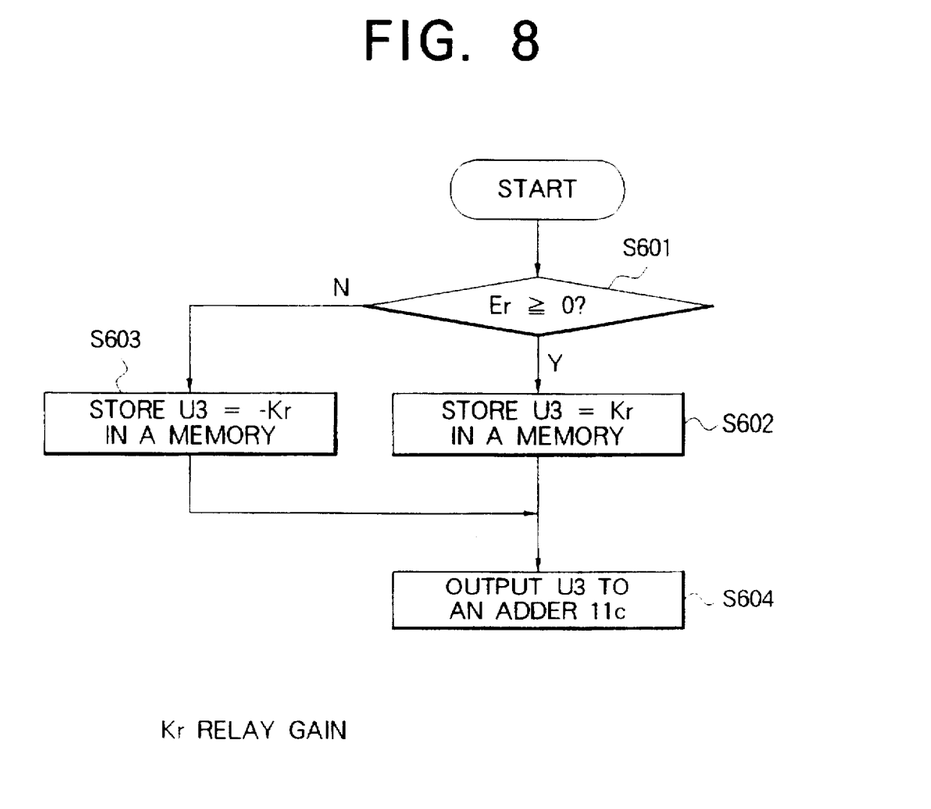
FIG. 8 is a flowchart showing the processing on a microcomputer according to a sixth embodiment of the present invention.

Now, the calculation procedure on a microcomputer of the first controller 11a of the sixth embodiment will be described while referring to a flowchart of FIG. 8. The processings until the target revolving speed error $E_r$ is calculated and then stored in a memory are the same as the first embodiment and therefore a description thereof will not be given. In step S601 it is judged whether the target revolving speed error $E_r$ is greater than or equal to zero.

If the target revolving speed error $E_r$ is greater than or equal to zero, in step S602 a value of a relay gain $K_r$ will be given to a feedback input U3 and the result will be stored in a memory. If the target revolving speed error $E_r$ is less than zero, in step S603 a value of $-K_r$ will be given to the feedback input U3 and the result will be stored in a memory. In step S604 the feedback control input U3 is output to an adder 11c. Thereafter, as with the first and second embodiments, a control input U, which is the sum of the feedback control input U3 and the feedforward control input U4, is calculated, and an output operation is repeated.

In the aforementioned sixth embodiment, the first controller is constituted by a relay controller. For this reason, even when a very small target revolving speed error $E_r$ occurs, a control input which causes a revolving speed error to disappear is sufficiently increased and therefore an actual revolving speed $N_e$ becomes equal to the target revolving speed $N_r$ at all times independently of a characteristic change in the clutch.

Therefore, there is obtainable an clutch control device in which there is no need for adjusting control parameters and attaching an additional sensor even with a characteristic change in the clutch, and in which even if control performance of the clutch control device reduces, no substantial vibration would occur in an automobile upon starting.

Seventh Embodiment

In this embodiment, a proportional part which effects the same proportional control as in the first embodiment is set to the relay controller of the first controller of the aforementioned sixth embodiment in a range where a target revolving speed error $E_r$ is within ±EL. In addition, the width EL of the proportional part is set so as to become more than the maximum value of the revolving speed which varies within the maximum delay time among the calculation delay time of the controller or the detection delay time of the revolving speed.

Figure 9:
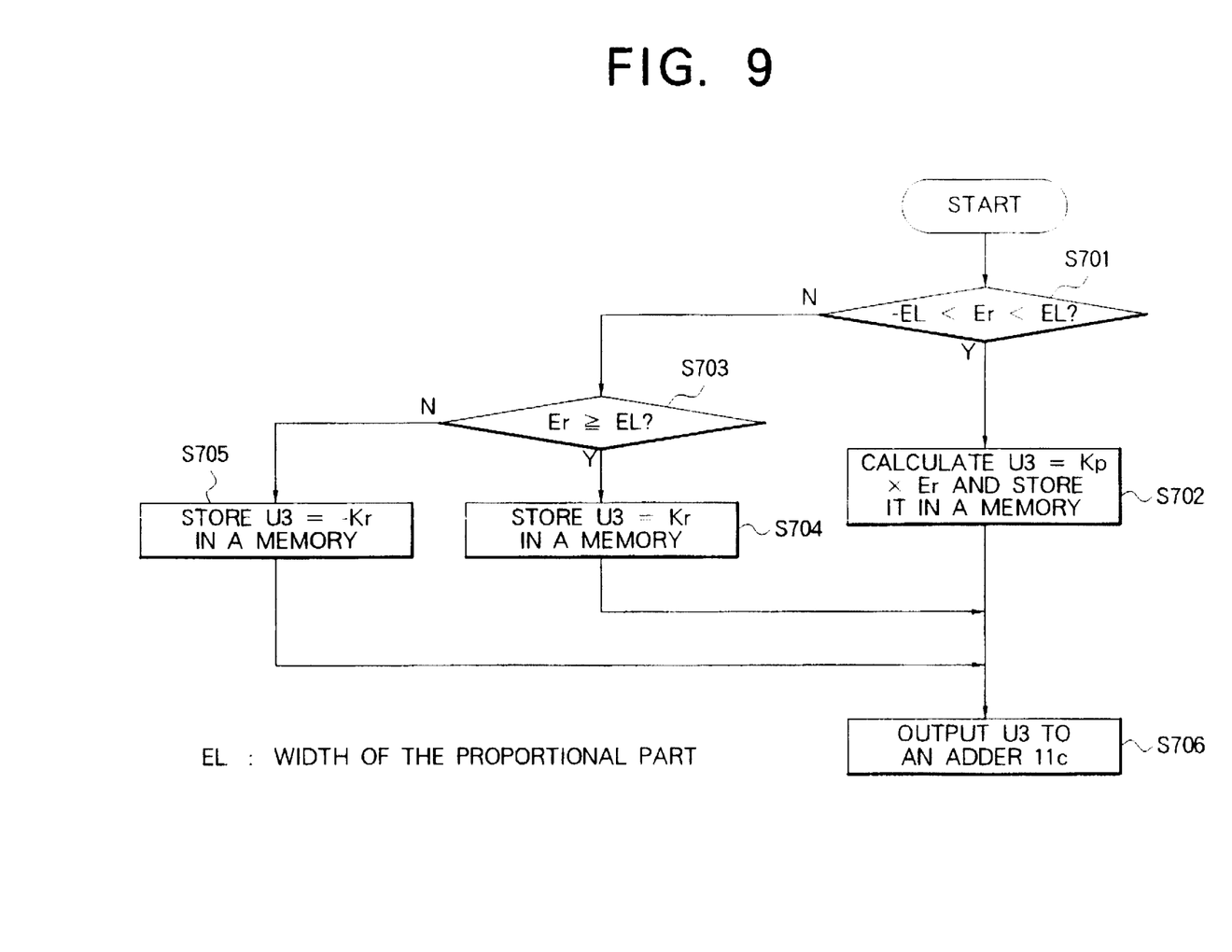
FIG. 9 is a flowchart showing the processing on a microcomputer according to a seventh embodiment of the present invention.

Now, the calculation procedure on a microcomputer of the first controller 11a of the seventh embodiment will be described while referring to a flowchart of FIG. 9. The processings until the target revolving speed error $E_r$ is calculated and then stored in a memory are the same as in the first embodiment and therefore a description thereof will not be given. In step S701 it is judged whether the target revolving speed error $E_r$ is in a range between $-EL$ and $EL$, i.e., $-EL<E_r<EL$.

When the target revolving speed error $E_r$ is in a range $(-EL<E_r<EL)$, in step S702 the product U3 of the target revolving speed error $E_r$ and a proportional gain $K_p$ is calculated and then stored in a memory. When the target revolving speed error $E_r$ is outside of that range, in step S703 it is judged whether $E_r$ ▯ EL.

In the case of $E_r$ ▯ EL, in step S704, a value of a relay gain $K_r$ is given to the feedback input U3 and the result is stored in a memory. In the case of $E_r<EL$, in step S705 a value of $-K_r$ is given to the feedback input U3 and the result is stored in a memory. In step S706 the feedback control input U3 is output to an adder 11c. Thereafter, as with the first and second embodiments, the sum U of the feedback control input U3 and the feedforward control input U4 is calculated, and an operation of outputting a control input U is repeated.

In the control using a relay as in the sixth embodiment, the relay changes directions until the time of the next relay switchover, when the time required for switching over the relay, which matches the calculation delay time of a controller or the detection delay time of a revolving speed $N_e$, is long, or when a revolving speed error is in a negative value near zero at the time of the switchover of the relay and goes to a positive value immediately after the switchover. As a result, a system which controls the revolving speed of an internal combustion engine becomes unstable due to the feedback control based on the relay and sometimes vibration occurs in the body of an automobile.

However, in the seventh embodiment, a proportional part which becomes the same proportional control as in the first embodiment is set to the same relay characteristic as that of the first controller of the aforementioned sixth embodiment in a range where the target revolving speed error $E_r$ is between $+EL$ and $-EL$. In addition, the width EL of the proportional part is set so as to become more than the maximum value of the revolving speed $N_e$ which varies within the larger of the calculation delay time of the controller or the detection delay time of the revolving speed $N_e$.

As a result, a control input becomes near zero when a revolving speed error is in a negative value near zero at the time of the switchover of the relay and goes to a positive value immediately after the switchover. Therefore, it becomes possible to prevent the problem that a system which controls the revolving speed of an internal combustion engine becomes unstable due to the feedback control based on the relay, and also it becomes possible to prevent vibration from occurring in the body of an automobile, which would otherwise sometimes happen.

While, in the seventh embodiment, a proportional part has been set in a range where a target revolving speed error $E_r$ is within ±EL, a nonsensitive band where an input become zero may be set in the same range.

Eighth Embodiment

In this embodiment, the width EL of the proportional part of the relay controller of the first controller 11a of the seventh embodiment is set to an addition constant $E_{td}$ plus the inverse number of the revolving speed detector output Ns of an internal combustion engine multiplied by a proportional constant $K_{de}$.

Figure 10:
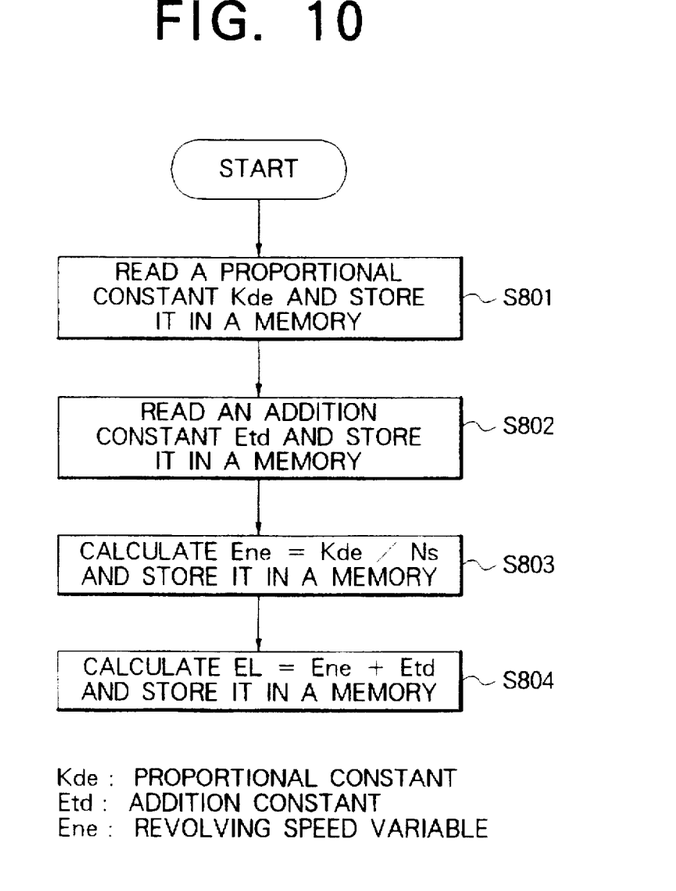
FIG. 10 is a flowchart showing the processing on a microcomputer according to an eighth embodiment of the present invention.

Now, the calculation procedure on a microcomputer of the first controller 11a of the eighth embodiment will be described while referring to a flowchart of FIG. 10. In this embodiment, only the calculation procedure of the width EL of the proportional part is shown. In step S801 a proportional constant $K_{de}$ is read in and then stored in a memory. In step S802 an addition constant $E_{td}$ is read in and then stored in a memory.

In step S803 the proportional constant $K_{de}$ is divided by the revolving speed detector output $N_s$, and the result is stored in a memory as a revolving speed variable $E_{ne}$. In step S804 the addition constant $E_{td}$ is added to the value stored in step S803 to calculate the width $E_p$ of the proportional part of the relay controller, and the width $E_p$ is stored in a memory.

In general, the switchover time of the relay is represented by the sum of the time during which an internal combustion engine rotates through a predetermined angle and the calculation time of the controller. Therefore, the width EL of the proportional part of the relay characteristic of the first controller 11a of this embodiment is set to an addition constant $E_{td}$ plus the inverse number of the revolving speed detector output $N_s$ of an internal combustion engine multiplied by a proportional constant $K_{de}$, whereby it becomes possible to set the width EL of the proportional part to an optimum value in correspondence to the relay switching time.

As a result, it becomes possible to prevent a reduction in the control performance of the clutch control device resulting from a characteristic change in the clutch which is caused due to an excessively large width EL of the proportional part.

Although, in the above embodiments, the invention is applied to an automobile with a clutch, it can also be applied to vehicles other than automobiles. Also, the engine can be any driving source such as an electric motor other than an internal combustion engine.

While the invention has been described with reference to specific embodiments thereof, it will be appreciated by those skilled in the art that numerous variations, modifications, and embodiments can be made, and accordingly, all such variations, modifications, and embodiments are to be regarded as being within the spirit and scope of the invention.

What is claimed is:

1. A clutch control device comprising:
    a clutch disposed on a torque transmission path between an engine and a driven member;
    target revolving speed generating means for generating a target revolving speed of said engine;
    revolving speed detecting means for detecting a revolving speed of said engine;
    revolving speed error calculating means for calculating an error between said target revolving speed and the detected revolving speed;
    clutch control means for outputting a clutch drive signal which corresponds to the calculated error;
    drive signal setting means for outputting a clutch drive signal which corresponds to the revolving speed of said engine; and
    an adder for adding the output of said clutch control means and the output of said drive signal setting means and outputting a clutch drive signal corresponding to the target revolving speed to said clutch, said clutch being controlled based on an output of said adder.

2. The clutch control device as set forth in claim 1, wherein said drive signal setting means comprises:

torque estimating means for calculating an output torque of said engine;

torque converting means for converting the target revolving speed to a corresponding torque; and clutch drive signal calculating means for outputting the clutch drive signal which corresponds to the revolving speed of said engine, based on a difference between the calculated output torque and the converted torque.

3. The clutch control device as set forth in claim 2, comprising: a throttle opening detector for detecting an opening degree of a throttle valve, wherein said torque estimating means calculates the output torque of said engine from the detected engine revolving speed and the detected throttle opening.

4. The clutch control device as set forth in claim 1, wherein said target revolving speed generating means comprises:

a target revolving speed calculating unit for calculating and outputting a steady-state value of the target revolving speed; and a second-order delay filter to which the output steady-state value of the target revolving speed is input and which outputs the target revolving speed by giving a second-order delay processing to the steady-state value.

5. The clutch control device as set forth in claim 4, further comprising:

a throttle opening detector for detecting an opening degree of a throttle valve; and a speed detector for detecting a speed of a vehicle on which said engine with said clutch is installed;

wherein said target revolving speed calculating unit calculates the steady-state valve of the target revolving speed based on either an output of said throttle opening detector or an output of said speed detector.

6. The clutch control device as set forth in claim 1, wherein said clutch control means has a relay characteristic.

7. The control device as set forth in claim 6, wherein said clutch control means sets a nonsensitive band having a predetermined width with a deviation of zero as a center to the relay characteristic, or sets a proportional part to the relay characteristic.

8. The clutch control device as set forth in claim 7, wherein the width of the nonsensitive band or the proportional part of the relay characteristic is a function of the sum of the inverse number of the revolving speed of the engine and a constant, multiplied by a coefficient.

9. The clutch control device as set forth in claim 1, wherein said clutch control means adds an integrated value of the error multiplied by a proportional gain to said error multiplied by a proportional gain, and then outputs the clutch drive signal which corresponds to said error.

10. The clutch control device as set forth in claim 1, wherein said clutch control means adds a differentiated value of said error multiplied by a proportional gain to said error multiplied by a proportional gain, and then outputs the clutch drive signal which corresponds to said error.

11. The clutch control device as set forth in claim 1, wherein said target revolving speed generating means comprises:

the target revolving speed calculating unit for calculating and outputting a steady-state value of the target revolving speed; and a first-order delay filter to which the output steady-state value of the target revolving speed is input and which outputs a target revolving speed by giving a first-order delay processing to the steady-state value.

12. The clutch control device as set forth in claim 11, further comprising:

a throttle opening detector for detecting an opening degree of a throttle valve; and a speed detector for detecting a speed of a vehicle on which said engine with said clutch is installed;

wherein said target revolving speed calculating unit calculates the steady-state valve of the target revolving speed based on either an output of said throttle opening detector or an output of said speed detector.

* * * * *